US008830330B2

(12) United States Patent
Jain et al.

(10) Patent No.: US 8,830,330 B2
(45) Date of Patent: Sep. 9, 2014

(54) ANALYSIS OF VIDEO FOOTAGE

(75) Inventors: Sachin Jain, Singapore (SG); Peter Rowan Kellock, Singapore (SG); Sheng Lo, Singapore (SG)

(73) Assignee: Muvee Technologies PTE Ltd., Singapore (SG)

( * ) Notice: Subject to any disclaimer, the term of this patent is extended or adjusted under 35 U.S.C. 154(b) by 37 days.

(21) Appl. No.: 13/612,826

(22) Filed: Sep. 12, 2012

(65) Prior Publication Data

US 2013/0004143 A1 Jan. 3, 2013

Related U.S. Application Data

(63) Continuation of application No. 12/709,866, filed on Feb. 22, 2010, now Pat. No. 8,319,834, which is a continuation of application No. 10/478,934, filed as application No. PCT/SG01/00101 on May 25, 2001, now Pat. No. 7,675,543.

(51) Int. Cl.
*G06K 9/00* (2006.01)
*H04N 5/225* (2006.01)
*G03B 17/00* (2006.01)

(52) U.S. Cl.
USPC ........... 348/169; 348/170; 348/171; 348/172; 348/173; 348/208.99; 396/52; 396/53; 396/54; 396/55; 382/168; 382/169; 382/170; 382/171; 382/172

(58) Field of Classification Search
USPC .............. 348/169–173, 208.1–208.4, 208.99; 396/52–55; 382/168–172
See application file for complete search history.

(56) References Cited

U.S. PATENT DOCUMENTS

| 5,172,233 | A | 12/1992 | Yoshihara et al. |
| 5,712,474 | A | 1/1998 | Naneda |
| 5,969,772 | A | 10/1999 | Saeki |
| 6,067,126 | A | 5/2000 | Alexander |
| 6,512,537 | B1 * | 1/2003 | Shimizu et al. ............... 348/155 |
| 6,992,700 | B1 * | 1/2006 | Sato et al. ................... 348/208.2 |
| 7,675,543 | B2 | 3/2010 | Jain et al. |
| 8,319,834 | B2 | 11/2012 | Jain et al. |
| 2002/0094026 | A1 * | 7/2002 | Edelson .................... 375/240.01 |
| 2003/0024975 | A1 * | 2/2003 | Rajasekharan ............... 235/375 |

FOREIGN PATENT DOCUMENTS

WO 02096095 A1 11/2002

OTHER PUBLICATIONS

Foreign Communication From a Related Counterpart Application—International Search Report and Written Opinion, PCT/SG01/00101, Feb. 28, 2002.
Office Action dated Feb. 14, 2008, U.S. Appl. No. 10/478,934, filed Jul. 19, 2004.
Final Office Action dated Nov. 26, 2008, U.S. Appl. No. 10/478,934, filed Jul. 19, 2004.
Office Action dated Mar. 23, 2009, U.S. Appl. No. 10/478,934, filed Jul. 19, 2004.

(Continued)

*Primary Examiner* — Chikaodili E Anyikire

(57) ABSTRACT

Segments of interest within video footage are identified automatically. Such segments of interest include portions of the footage which were taken using a hand held camera and which show a static subject, portions which track the motion of a moving subject, and portions which show an abrupt event. Methods are presented for identifying such segments, based on motion and/or colour analysis of the video footage or based on observations of discontinuities in the video footage following a period of stability.

7 Claims, 10 Drawing Sheets

(56) References Cited

OTHER PUBLICATIONS

Notice of Allowance dated Oct. 19, 2009, U.S. Appl. No. 10/478,934, filed Jul. 19, 2004.

Office Action dated Mar. 13, 2012, U.S. Appl. No. 12/709,866, filed Feb. 22, 2010.

Notice of Allowance dated Jul. 10, 2012, U.S. Appl. No. 12/709,866, filed Feb. 22, 2010.

* cited by examiner

ANALYSIS OF VIDEO FOOTAGE

CROSS-REFERENCE TO RELATED APPLICATIONS

This application is a continuation of and claims priority to U.S. patent application Ser. No. 12/709,866, filed Feb. 22, 2010, entitled "Analysis of Video Footage," by Sachin Jain, et al., which is a continuation of U.S. patent application Ser. No. 10/478,934, filed Jul. 19, 2004, entitled "Analysis of Video Footage," by Sachin Jain, et al., and issued as U.S. Pat. No. 7,675,543, on Mar. 9, 2010, which in the National Stage of and claims priority to International Application No. PCT/SG2001/000101, filed on May 25, 2001, entitled "Analysis of Video Footage," by Sachin Jain, et al., all of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present invention relates to processes and apparatus for identifying portions of a video footage. Once identified, the portions can be used for multiple purposes. For example, they can be recalled selectively based on their properties, compiled to form a shortened form of the footage, or used as the basis for video editing of the footage such as by using them as a basis for combination with an audio soundtrack.

Modern devices for recording video footage make it easy to accumulate very large amounts of material which take a very long time to review or process. For example, removing uninteresting footage from within shots taken during a holiday can be a time-consuming process. Similarly, security cameras record vast quantities of footage within which only relatively short sequences containing unusual events are of interest afterwards.

Currently, video editing systems do not provide any form of high level segmentation, but are based on extraction of key frames from the footage based on color histograms and motion detection.

SUMMARY

The present invention aims to provide new and useful methods and apparatus for analyzing video footage to identify portions which are likely to be of interest to a user.

In particular, a first aspect of the invention is to identify such portions (e.g. within video footage stored in a video database) by applying at least one "high-level" analysis of the footage. Three examples of such a high-level analysis are analysis to identify footage which shows a static subject (here referred to as a "Static interest segment" or SIS), to find footage which tracks the motion of a subject (here referred to as a "tracking interest segment" or TIS), and to find footage which shows an abrupt event (here referred to as an "abrupt event interest segment" or AEIS).

In the second to fourth aspects of the invention, discussed in detail below, methods are proposed for identifying segments of the footage which are one of these three types of footage.

For some applications (especially the identification of SISs and TISs) it is appropriate to identify such segments in absolute terms as time-periods within the footage. For example, each segment may start at a respective time X and end at a respective time Y, so that the identification of the segments involves determining the values of X and Y. This can be achieved by averaging and thresholding mechanisms well-known in the art. Specifically, we may calculate per-frame descriptors and check where the cluster of frames have descriptor values above a certain threshold (by averaging and thresholding mechanisms). If these cluster of frames satisfy the conditions of a particular interest segment, then the frame from which cluster is starting is marked as X and the frame where its ending is marked as Y.

For other applications it is preferable to consider the footage as a series of "slices" (for example 0.5 seconds in duration) and store value(s) for each slice indicating the probability that the slice belongs to one or more of the types of interest segments. A portion of footage, which corresponds to one of the interest segment can then be identified as a series of slices having a high value of the probability values.

The methods proposed here for identifying SISs and TISs are motivated by considering the ways in which human cameramen, and especially amateur cameramen, operate a video camera.

The second aspect of the invention relates to identifying Static Interest Segments (SISs). Note that SIS's may exist as some small segments in the shot or as entire shots. The former occurs when the cameraman moves the camera until something of interest is seen and then holds steady. The latter occurs when the cameraman decides on a static shot beforehand, holds the camera steady, then records and stops without moving it substantially. Since the majority of amateur cameramen move the camera a great deal while shooting, in footage shot with a handheld camera it is common to observe there are sections where the cameraman searches for an interesting subject by constantly moving the camera around. Upon seeing something interesting, the cameraman would then try to capture the subject by fixing the camera angle on it, to form a pseudo-static Segment, which constitutes a SIS. SISs are typically a few seconds in duration and constitute selections from the footage of material, which is on average better than the surrounding footage.

The second aspect of the present invention proposes two steps for detecting SIS's, both of which may be performed by motion analysis.

Firstly, it is established (if this fact is not already known, e.g. based on information provided together with the video footage) that the material is from a handheld camera (Videos captured by a mounted-camera tend to exhibit different dynamics to those which are exploited in the second step). A number of heuristics can be applied for this purpose: If the average global movement is high, it is probably handheld. If the angle of global movement is not along an axis, it is probably handheld. If there are any segments lasting more than a fraction of a second, which are completely static, it is almost certainly taken by a tripod mounted-camera. If there are any segments lasting more than about a second in which the direction of motion is very constant, it is almost certainly taken by a tripod mounted-camera (shot from a tripod).

Secondly, the segment should show the following two characteristics: The total global movement is low (e.g. measured as the Speed of camera between consecutive pairs of frames in the segment). This occurs because the cameraman was trying to hold the camera steady. The angle of motion is changing rapidly. This occurs because it is not possible to hold a handheld camera completely steady—there is always some shake and drift which the cameraman continuously corrects.

A third aspect of the invention relates to identifying Tracking Interest Segments s (TISs). Frequently, when a cameraman is shooting a scene, he finds something interesting and tries to capture it. If the subject is moving then cameraman tries to track its motion i.e. moving the camera in the direction in which subject is moving, so that subject always remains in the viewfinder. For example, the moving subject could be a bird flying in the sky or a person walking across the camera. As mentioned above, we refer to these segments as Tracking Interest Segments (TISs). TISs are typically a few seconds in duration, and can be assumed to be more important than the surrounding footage. Note that TIS's may exist as some small segments in the shot or as entire shots. The former occurs when the cameraman tries to find something interesting either in a static scene or by moving the camera around and once he finds something interesting he tries to track the interesting object. The latter occurs when the cameraman decides on an interesting object beforehand and tries to track the movement of the interesting object in the whole shot.

The third aspect of the invention proposes that TISs are detected in two steps.

Firstly, we propose finding out whether camera is moving in the scene and whether it is moving in a particular direction. For this following rules can be used: If the average global movement is high, it is probably due to camera motion. If the change in angle of global movement in successive frames is relatively less, then the camera is probably moving in one particular direction.

Secondly, we identify if there is a subject in the scene against a moving background. For this it can be safely assumed that most of the time the object being tracked will be at the center of the frame. A small window is drawn at the center of the frames and the change in color distribution within the window is compared to that outside of the window. If the object is always there in the scene then for successive frames the change in color distribution in the window will be less as compared to the portion outside window.

The fourth aspect of the invention relates to a method for detecting an abrupt event interest segment (AEIS), by which is meant a moment in a video when something special and sudden takes place. Examples of such special moments include moments when a speeding car hits a tree, the moment when a car race starts or the moment when a bomb explodes. AEISs can be defined as those particular instants of time when a pattern of motion or shape or color in a scene, which was continuing for some time, changes suddenly. Broadly speaking, AEISs happen when one of more of the following features occur: 1) the velocity (i.e. direction or speed or both) of an object in the scene changes suddenly; 2) the velocity (i.e. direction or speed or both) of camera while shooting a scene changes suddenly; or 3) the size or shape or color (or some combination of these) of an object in the scene changes suddenly.

To human perception, AEISs are undoubtedly more interesting than the surrounding material because they refer to a change in an otherwise uniform pattern in the scene. For example, the scene of an object undergoing an explosion, or propulsion, compared to a static shot of the object carries more visual impact, and it is often of higher interest.

The fourth aspect of the present invention proposes the detection of AEISs by the steps of identifying clusters of frames which have the same pattern of motion and color distribution, and observing whether the pattern changes suddenly at the ends of the clusters.

AEISs identified in this way may be assigned a strength value, which indicates how strong an AEIS is. The strength value of an AEIS depends upon (i) how long, e.g. measured as the length of a sequence of frames, a certain pattern was present before the abrupt event (the longer the duration of the pattern, the stronger the AEIS), and (ii) how fast the change takes place (the faster the change, the stronger the AEIS).

Once identified, the SISs, TISs and AEISs may be used in content-based video information retrieval. Sections of high interest can be recovered from a media database automatically in response to a user query. Alternatively an abstract or summary consisting of the highlights from a body of video material can be generated automatically.

Furthermore, the AEISs may be used in video editing, since it is common to align video material so that the timing of events is synchronised with the beat of the music or with the timing of significant features of the music. This is particularly true of motion events involving an abrupt deceleration, such as collisions between objects. For example, if a professional editor is incorporating a shot in which a falling object hits a floor, he is likely to align this moment with a strong beat or other prominent event in the music Although the invention has been defined above in terms of methods, additionally the invention provides apparatus arranged to receive video footage and process it according to any of the inventive methods described above. It further provides computer program products readable by a computer device and which cause the computer device to perform a method according to any of the methods.

Although the invention is often described herein in relation to deriving information from "successive" frames, it should be understood that in certain embodiments, especially ones in which the number of frames per second in the footage is high, the frames need not be immediately in sequence, but rather embodiments of the invention may achieve adequate accuracy by employing sequences of frames which are a selection from the total footage (e.g. sequences which are every other frame of the original footage), and in this case the term "successive" frames of the footage is used to mean successive frames of this selection.

BRIEF DESCRIPTION OF THE DRAWINGS

Embodiments of the invention will now be described for the sake of example only with reference to the accompanying figures, in which.

DETAILED DESCRIPTION

Figure 1:
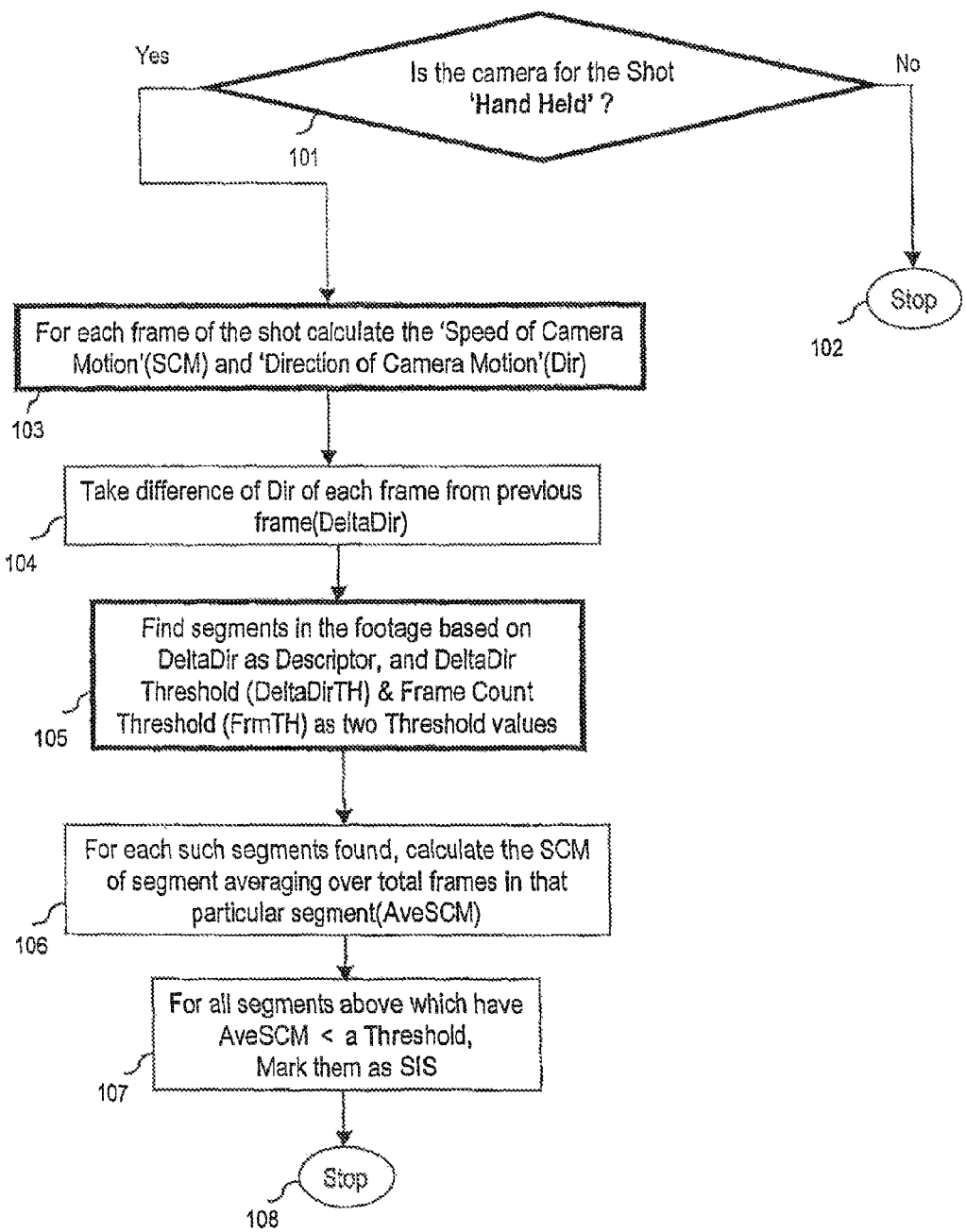
FIG. 1 shows steps in a method according to the invention for finding static interest segments within a Shot.
Figure 2:
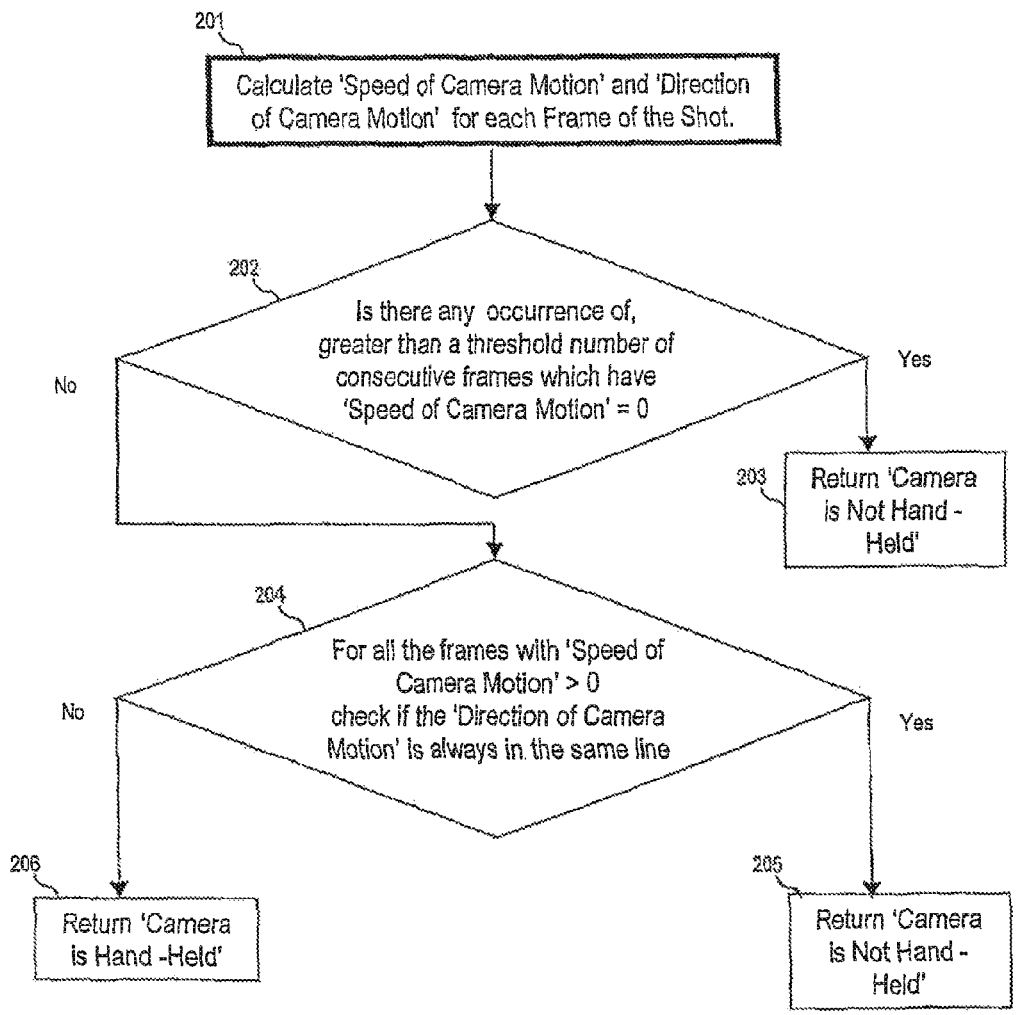
FIG. 2 shows steps in a method for determining if the camera was handheld or tripod mounted while taking the Shot.

FIG. 1 shows a method of finding SISs in footage (specifically in a single "shot", defined in this document as the footage between one switching "on" of the camera and the next switching "off" of the camera). First of all we check whether the footage we are searching for SISs was shot with a handheld camera held or if it was tripod mounted [101]. A method for performing step [101] is shown in FIG. 2 and is explained below. If camera was tripod mounted then there are no SISs by definition and no further searching for SISs is done (Output "No" from box 101) (step [102]).

Figure 3:
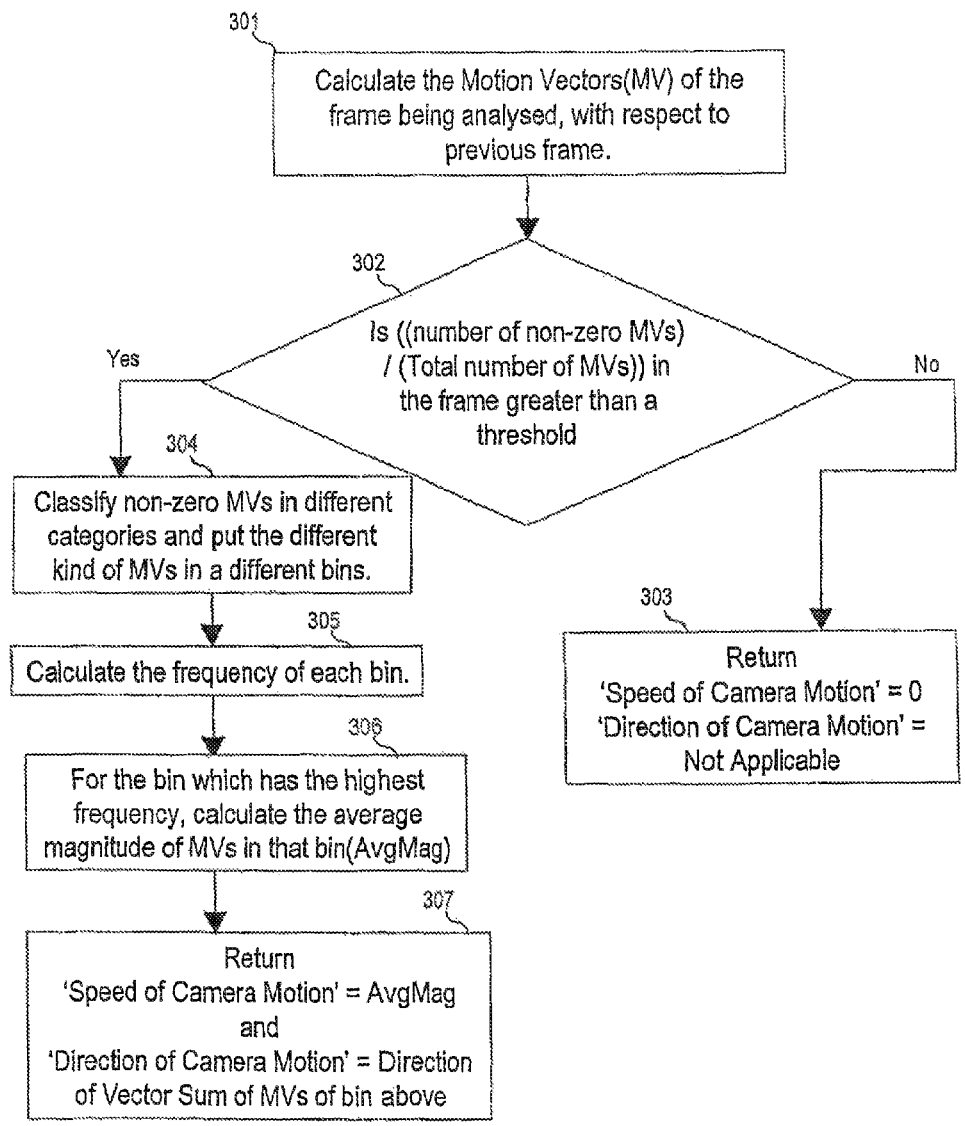
FIG. 3 shows steps in a method for determining the 'Speed of Camera Motion' and 'Direction of Camera Motion' exhibited by a frame.

If the footage was taken with a handheld camera (output "Yes" from box 101). then we calculate (step [103]) the 'Speed of Camera Motion' and 'Direction of Camera Motion' (Dir) for each frame of the footage. A method for performing step [103] is shown in FIG. 3 and is explained below.

Now for each frame in the footage, we take absolute difference of Dir, from Dir of previous frame (DeltaDir) (step [104]).

Figure 4:
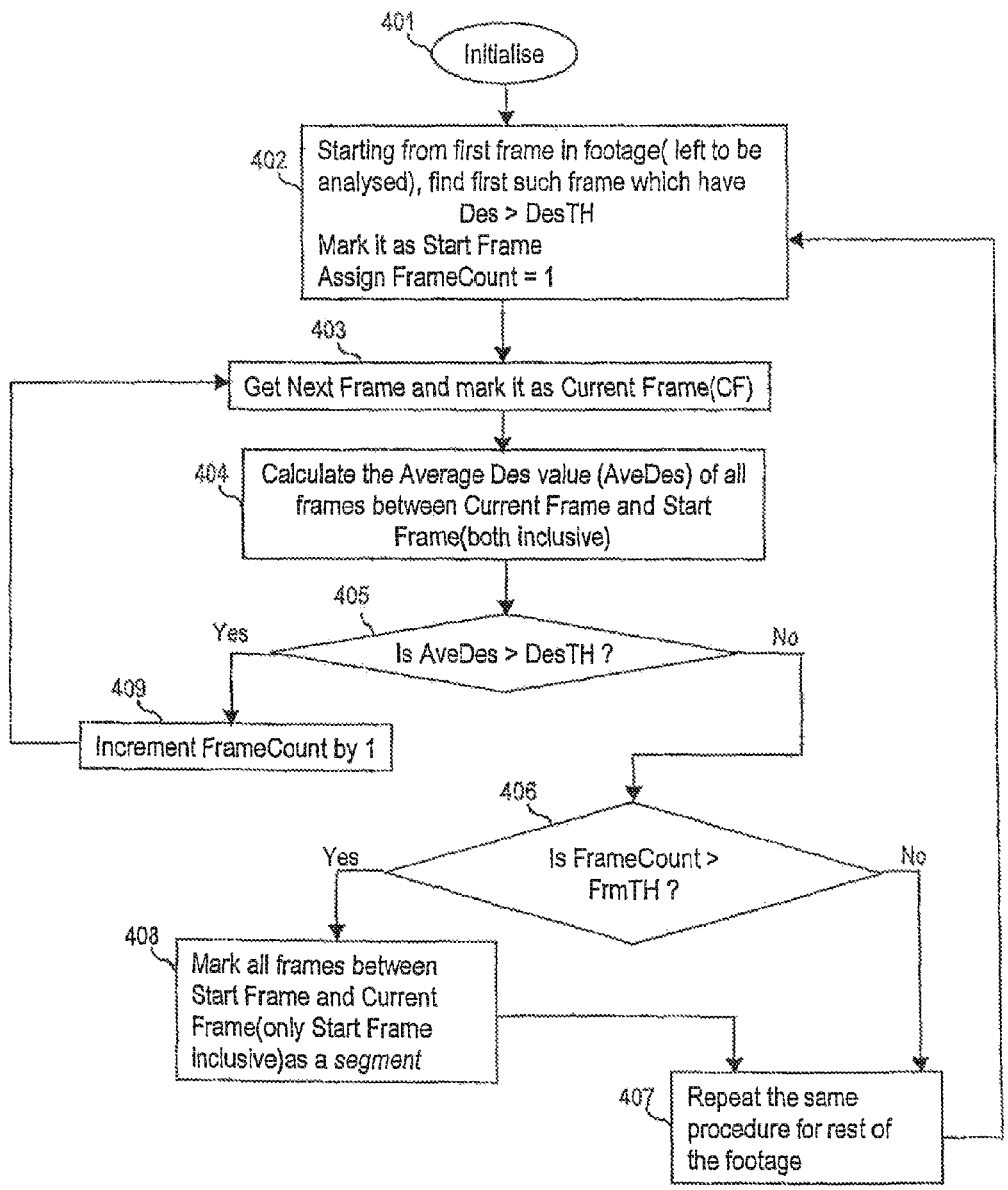
FIG. 4 shows a method for finding segments in video footage, which exhibit some special properties.

Now we look for the segments in the footage, using DeltaDir as descriptor and DeltaDir Threshold (DeltaDirTH) and Frame Count Threshold (FrmTH) as two Threshold values (step [105]. Both the thresholds are user defined. A method for performing step [105] is shown in FIG. 4 and is explained below.

It is also possible that the whole footage is one single segment. This could arise if the cameraman decides on a static shot beforehand, holds the camera steady, then records and stops without moving it subsequently.

Thus, step [105] indicates places in the footage where the angle of global motion is changing rapidly, which is the first characteristic for SIS by definition. This occurs because it is not possible to hold a handheld camera completely steady—there is always some shake and drift which the cameraman continuously corrects.

Now, for all the segments found in step [105] we calculate the 'Speed of Camera Motion' averaged over all frames in the respective segments (step [106]). All the segments, which have this average 'Speed of Camera Motion' below a threshold, we mark it as SIS (step [107]).

Step [107] is for satisfying the second characteristic of SIS, which says that the total global movement is low.

FIG. 2 describes a method of deciding whether a footage (Shot) was taken with camera held in hand or it was tripod mounted.

Firstly, in step [201] for each frame of the footage we determine the 'Speed of Camera Motion' and 'Direction of Camera Motion' descriptor using the process described below with reference to FIG. 3.

In step [202], we find all those continuous set of frames, which have 'Speed of Camera Motion' equal to zero. These continuous occurrences represent those portion of the footage where camera was perfectly steady. If there are any such occurrences and the number of frames in any such set is greater than a threshold ('n'), then it certain that camera was 'Not Hand-Held' (step [203])(Output "Yes" from box [202]), as for a human cameraman it's not possible to hold the camera perfectly steady for more than few seconds In step [204], we check the 'Direction of Camera Motion' (dir) for all those frames, which have 'Speed of Camera Motion' greater than 0. If the dir for all such frames lies along a single axis, then it means that camera was 'Not Hand-Held' (step [205]) (Output "Yes" from box [204]), as for a human cameraman it's not possible to pan or rotate the camera for the whole footage with such precision.

If the Output is "No" from box [204] then it means that there was some shake or jerkiness in the camera motion, so camera can't be tripod mounted. And hence we mark the footage as 'Hand-Held' (step [206]).

Dir calculated in step [502] lies between 0 and 360 degrees. If Dir is between 180 and 360 degrees then we subtract 180 degree from it (step [503]). This is to make sure that back and forth motion of camera is counted as moving in same direction:

In step [504] we calculate the standard deviation of all Dir's calculated in step [503], and in step [505] we check whether calculated standard deviation is less than a threshold. If "Yes", then it means that the calculated values of Dir are substantially aligned in one particular direction, which is likely to be due to the smooth motion of tripod mounted camera and we mark the footage as 'Tripod Mounted' (step [507]).

If the calculated standard deviation is greater than a threshold, then that means that that the calculated values of Dir are not aligned in one particular direction, which indicates that either the panning of the camera is not smooth or that the camera is moving in all directions. Either of these features suggests that the cameraman is holding the camera in his hand while taking this particular footage. So we mark the footage as 'Hand Held' (step [506]).

FIG. 3 describes a method for calculating the 'Speed of Camera Motion' and 'Direction of Camera Motion' in a frame.

First, in step [301], we calculate the Motion Vectors of the frame being analysed with respect to previous frame.

Next, we calculate how much fraction (Frac) of the figure is showing motion. This is calculated by taking ratio of number of Motion Vectors (calculated in step [301]) having non-zero magnitude with total Motion Vectors in the frame. Total Motion Vectors in the frame is equal to all the blocks in the frame for which Motion Vectors were calculated. Now we check whether the Frac calculated above is greater than a threshold. If the camera was moving while shooting this particular frame, then most of the Motion Vectors will have non-zero magnitude and hence the Frac will be higher than the set threshold (Output "Yes" from box [302]). Otherwise, if the Frac is lower than threshold then it means that camera was steady while shooting and the non-zero Motion Vectors (if any) are the result of some object(s) moving in front of the camera (Output "No" from box [302]). So we assign 'Speed of Camera Motion' equal to zero and 'Direction of Camera Motion' is undefined (step [303]).

Now, if the output is 'Yes' from box [302], we classify the non-zero Motion Vectors in different categories depending upon their direction (step [304]). For example, as the direction of Motion vectors vary from 0 to 360 degrees, so we can define bins at 10 degree interval, such that all the Motion Vectors having direction from 0-10 degree will go into a single bin and from 10-20 degree in another and so on.

After putting all the Motion Vectors in different bins, we calculate the frequency of each bin i.e. the number of Motion Vectors in that bin (step [305]).

Since in a frame, if camera is moving then most of the Motion Vectors will be due to this camera motion. Only those motion vectors, which result due to combination of both Camera Motion and some object(s) movement in the scene, will have different direction from the rest. So, the bin with the highest frequency will correspond to the Motion Vectors only due to Camera Motion. Now, we calculate the average magnitude of Motion Vectors in the bin (step [306]) and assign it as 'Speed of Camera Motion' (step [307]). For calculating the 'Direction of Camera Motion' we calculate the vector sum of all Motion Vectors in the bin and assign direction of this Vector Sum to 'Direction of Camera Motion' (step [307]).

FIG. 4 describes a method for finding segments in a footage based on passed parameters. A segment is a set of consecutive frames in the footage, which on an average shows some deviation from normal behavior.

First of all, all the parameters are received from the algorithm, which calls this method (step [401]). The parameters received are: 1) per frame Descriptor values (Des): For each frame in the footage, an associated descriptor value is received. The segments are found based upon the behavior of this descriptor value. 2) Descriptor Threshold Value (DesTH): This threshold describes the normal behavior of the descriptor values obtained above. If Des is less than or equal to DesTH, then it's considered as normal behavior. 3) Minimum Frames Count Threshold in a segment (FrmTH): There has to be some minimum number of continuous frames, showing deviation from normal behavior, to constitute a segment. This is because few frames say 2-3 frames can show a deviation from normal behavior, but they may not be of any computational importance at all. So FrmTH puts a lower bound on the minimum number of frames in a segment.

Besides, a variable named 'FrameCount' is also defined to keep track of the current number of frames in a budding segment.

Now, start from first frame in the footage, which has Des value above DesTH and marking it as StartFrame of the budding segment and assign FrameCount as 1 (step [402]). Now we keep on including next frames in the budding segment and keep on incrementing the DrameCount, as long as the value of Des averaged over all frames in the budding segment remains above DesTH (step [403,404,405,409]). At the frame at which average Des value goes below DesTH (Output 'No' from box [405]) we compare the FrameCount with FrmTH (step [406]). If FrameCount is above FrmTH (Output 'Yes' from box [406]), then we mark all the frames starting from StartFrame to CurrentFrame as segment (step [408]) otherwise it's discarded. Now we repeat the same procedure for finding more segments in rest of the footage (step [407]) i.e. the footage left after the CurrentFrame.

Figure 5:
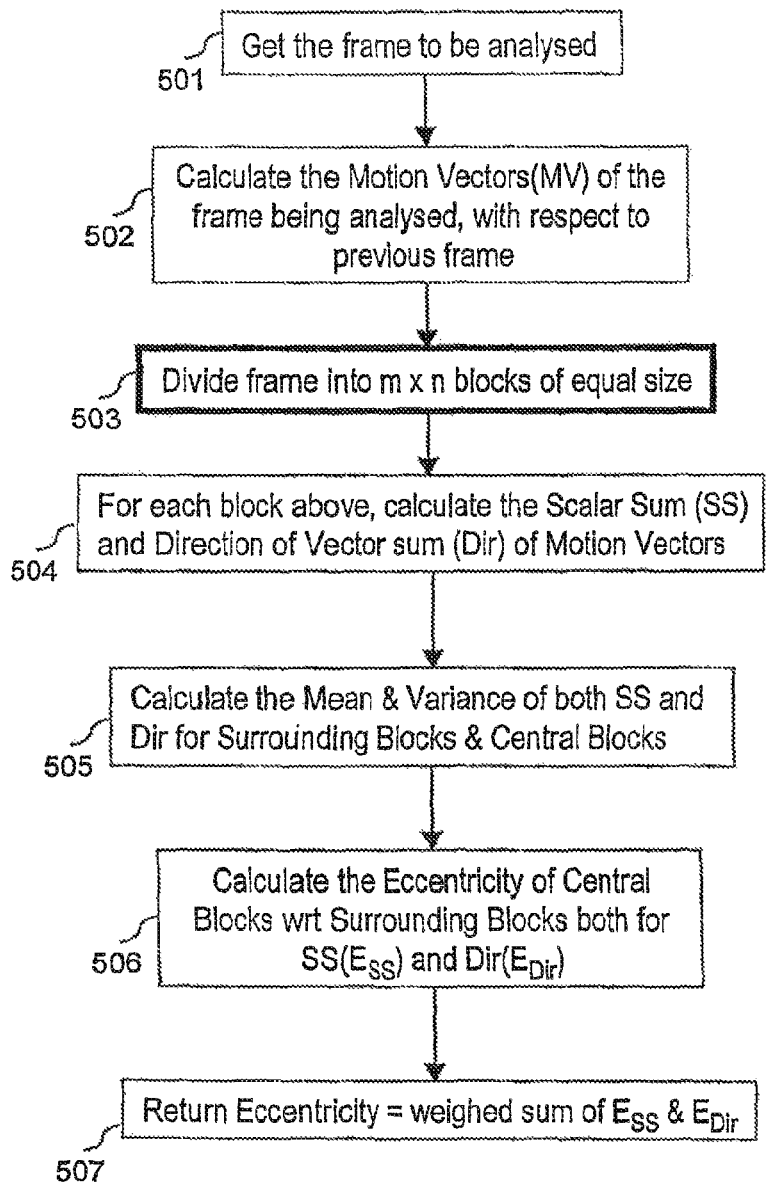
FIG. 5 shows a method for finding an Eccentricity descriptor of a frame in video footage.

FIG. 5 describes a method for calculating the Eccentricity descriptor of a frame. This high level descriptor gives a measure of relative difference between the central part of the frame and rest of the frame, in terms of some other low level descriptors of the frame based on motion and color distribution, which are calculated with respect to the immediate predecessor of the frame being analyzed.

The Eccentricity may be calculated in statistical terms as the deviation of the set of descriptors characterizing the central region of the frame from the average values of the corresponding descriptors characterizing a set of regions outside the central region of the frames.

First of all, we get the frame being analyzed (step [501]) and calculate the Motion Vectors of this with respect to the immediate previous frame (step [502]).

Now, we divide the frame being analyzed into "m×n" blocks (Blk) and out of these blocks we choose "p×q" blocks at the center as Central Blocks as shown in FIG. 5 (step [503]) and is explained below. In the figure
m=12; n=9; p=6; q=3;

Values m. n, p and q are user dependent. Typical values can be:
m=3; n=3; p=1; q=1;

Now for each block, we calculate the Scalar Sum (SS) and direction of Vector Sum (Dir) of Motion Vectors belonging to the respective block (step [504]).

After that we calculate the Mean and Variance of both SS and Dir of Surrounding Blocks and Central Blocks (step 505]). We denote various values calculated as:
$M^{SB}_{SS}$=Mean of SS of Surrounding Blocks
$M^{SB}_{Dir}$=Mean of Dir of Surrounding Blocks
$V^{SB}_{SS}$=Variance of SS of Surrounding Blocks
$V^{SB}_{Dir}$=Variance of Dir of Surrounding Blocks
$M^{CB}_{SS}$=Mean of SS of Central Blocks
$M^{CB}_{Dir}$=Mean of Dir of Central Blocks
$V^{CB}_{SS}$=Variance of SS of Central Blocks
$V^{CB}_{Dir}$=Variance of Dir of Central Blocks Now we calculate the Eccentricity of Centre Blocks with respect to the Surrounding Blocks, both for SS ($E_{SS}$) and Dir ($E_{Dir}$) (step [506]). It is calculated as:

$$E_{SS}=\text{absolute}(M^{CB}_{SS}-M^{SB}_{SS})/H_{SS}$$

$$E_{Dir}=\text{absolute}(M^{CB}_{Dir}-M^{SB}_{Dir})/360$$

Where, $H_{SS}$=Highest value of SS i.e. the highest possible value of Scalar Sum of Motion Vectors of a block, which in turn is equal to the maximum possible magnitude of a Motion Vector multiplied by maximum possible Motion Vectors in a block.

Now we calculate the weighed sum of $E_{SS}$ and $E_{Dir}$, calculated above to get the Eccentricity descriptor of this frame (step [507]) i.e.

$$\text{Eccentricity}=W_{SS}*E_{SS}+W_{Dir}*E_{Dir}$$

Where, $W_{SS}$ and $W_{Dir}$ are associated weights and $0 \leq W_{SS}$, $W_{Dir} \leq 1$ and $$W_{SS}+W_{Dir}=1$$

Weights $W_{SS}$ and $W_{Dir}$ above can be calculated based on various quantities calculated in step [505]. For example, If $M^{SB}_{SS}$ is below a threshold then we can assume that there is not enough motion in the Surrounding Blocks, so the Dir has hardly and meaning and we can use $W_{SS}$=1 and $W_{Dir}$=0, otherwise we check $V^{SB}_{Dir}$. If it's above a certain threshold then we can assume that direction of Surrounding blocks is varying a lot so the $V^{SB}_{Dir}$ hardly has any meaning and we can use $W_{SS}$=1 and $W_{Dir}$=0; otherwise we use $W_{SS}$=0.5 and $W_{Dir}$=0.5.

There can be an alternative approach also for calculating Eccentricity based on the absolute difference of color of the frame being analyzed and the immediate previous frame. In this approach we calculate the absolute difference (Diff) of color of each pixel of frame being analyzed from the pixel at the same location in immediate previous frame. After that we calculate the mean of the Diff of all pixels in Central Blocks and of all pixels in the Surrounding Blocks separately and take the absolute difference ($M_{diff}$) of two means. After that we normalise the $M_{diff}$ by dividing it by maximum possible value of color of a pixel. This normalised $M_{diff}$ is the Eccentricity.

Figure 6:
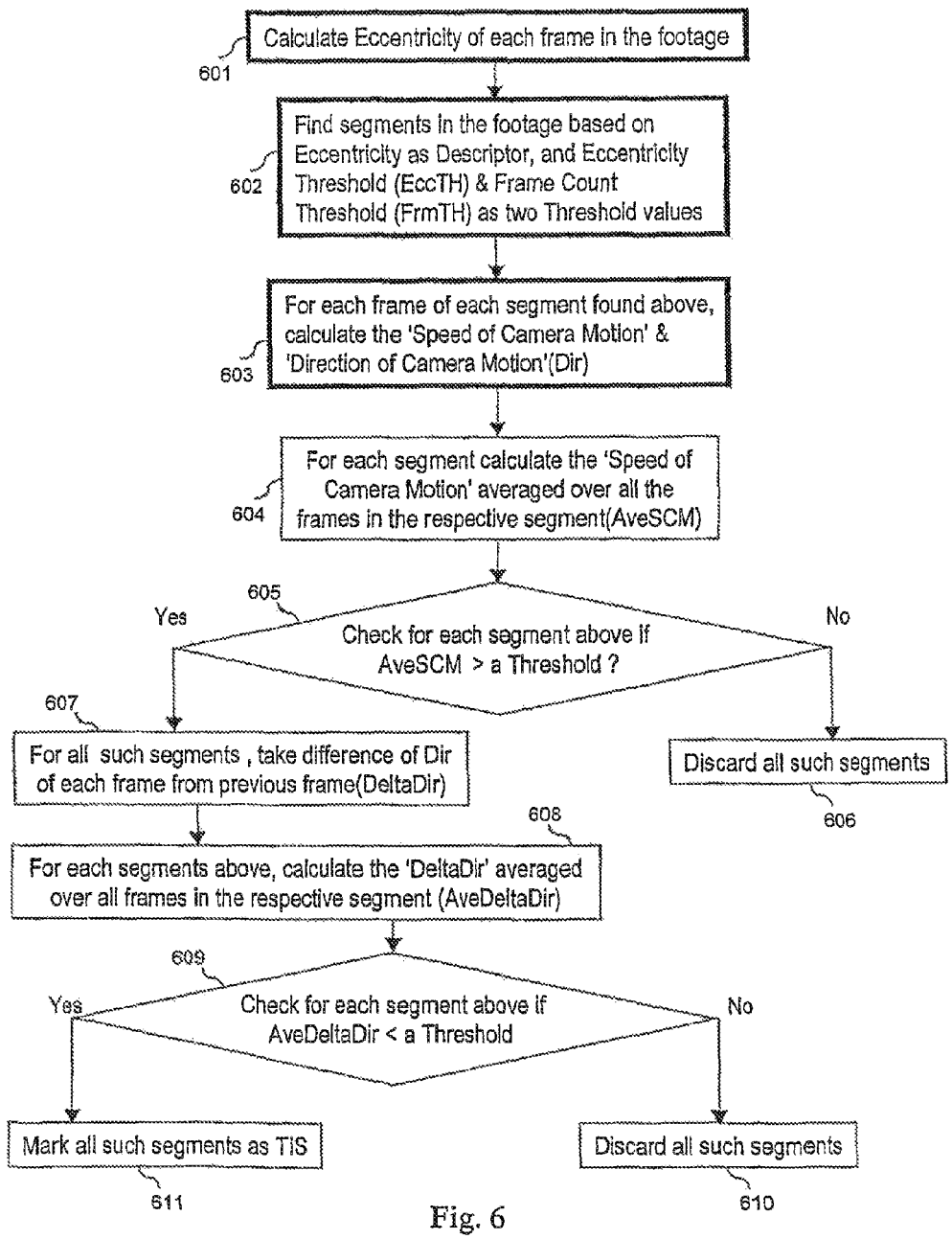
FIG. 6 shows steps in a method according to the invention for finding tracking interest segments within video footage.

FIG. 6 shows a method according to the invention for finding TISs in video footage. First of all we check for that condition of TIS, mentioned in invention, which says that if an object is being tracked then it does not show motion with respect to rest of the frame, i.e. it appears to be static. So, if the object is at the center of the frame, which is usually the case, then the color distribution changes less at the center of the frame than in the rest of the frame For this we calculate the Eccentricity descriptor of each frame in the footage being analyzed for TIS (step [601]). A method for performing step [601] is shown in FIG. 5 and is explained above.

Now we look for the segments in the footage, using Eccentricity as descriptor and Eccentricity Threshold (EccTH) and Frame Count Threshold (FrmTH) as two Threshold values (step [602]. Both the thresholds are user defined. A method for performing step [602] is shown in FIG. 4 and is explained above.

So, the steps [601,602], tell us about those segments of the footage which satisfy the above mentioned condition of TIS. Now we check these segments for another conditions of TIS, mentioned in invention, that (a) There should be camera motion (b) Change in angle of camera motion in successive frames is relatively less.

For this we calculate the 'Speed of Camera Motion' and 'Direction of Camera Motion' (Dir) of each frame of segments found above (step [603]). A method for performing step [603] is shown in FIG. 3 and is explained above.

Now, for checking condition (a) above, we calculate the average 'Speed of Camera Motion' of each segment by taking average of 'Speed of Camera Motion' of all frames in the respective segments (step [604]) and check for each segment if it's greater than a threshold (step [605]).

For these segments, which do not satisfy this condition (output 'No' from box [605]), we discard them from further consideration for TIS (step [606]). For the rest of the segments (output 'Yes' from box [605]), we check for condition (b).

For this, we take the absolute difference of Dir of each frame of each segment above, from Dir of previous frame (DeltaDir) (step [607]). Now, for each segment above we calculate the DeltaDir averaged over all frames in the respective segment (step [608]) and check if this average value is less than a threshold (step [609]). Segments which have output 'Yes' from box [609], satisfy the condition (b) also and we mark them as TIS (step [611]) and discard the rest of the segments (output 'No' from box [609]) (step 610]).

Figure 7A:
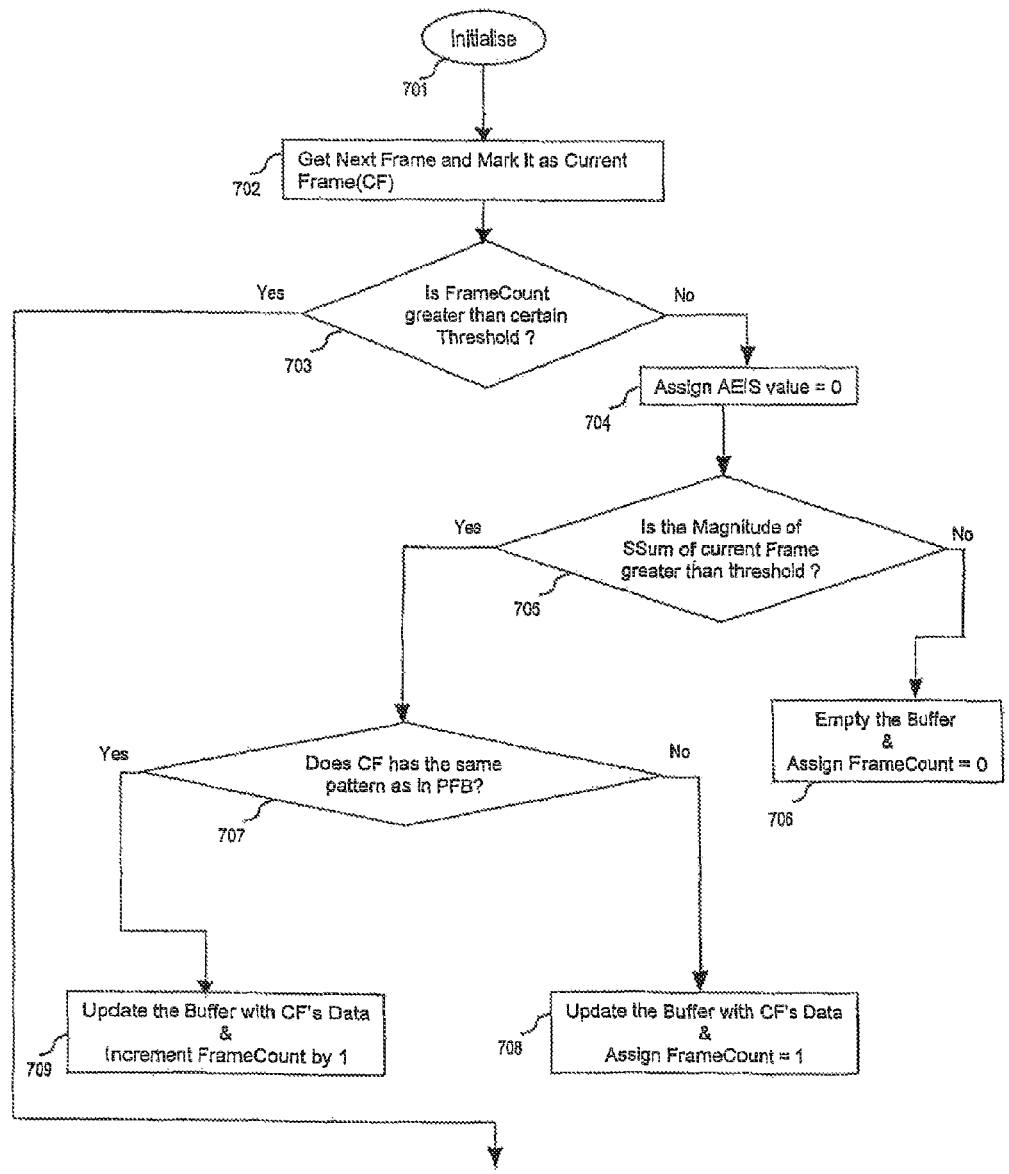
FIG. 7, which is composed of FIG. 7(a) and FIG. 7(b), shows steps in a method for calculating an abrupt event descriptor value of any frame.
Figure 7B:
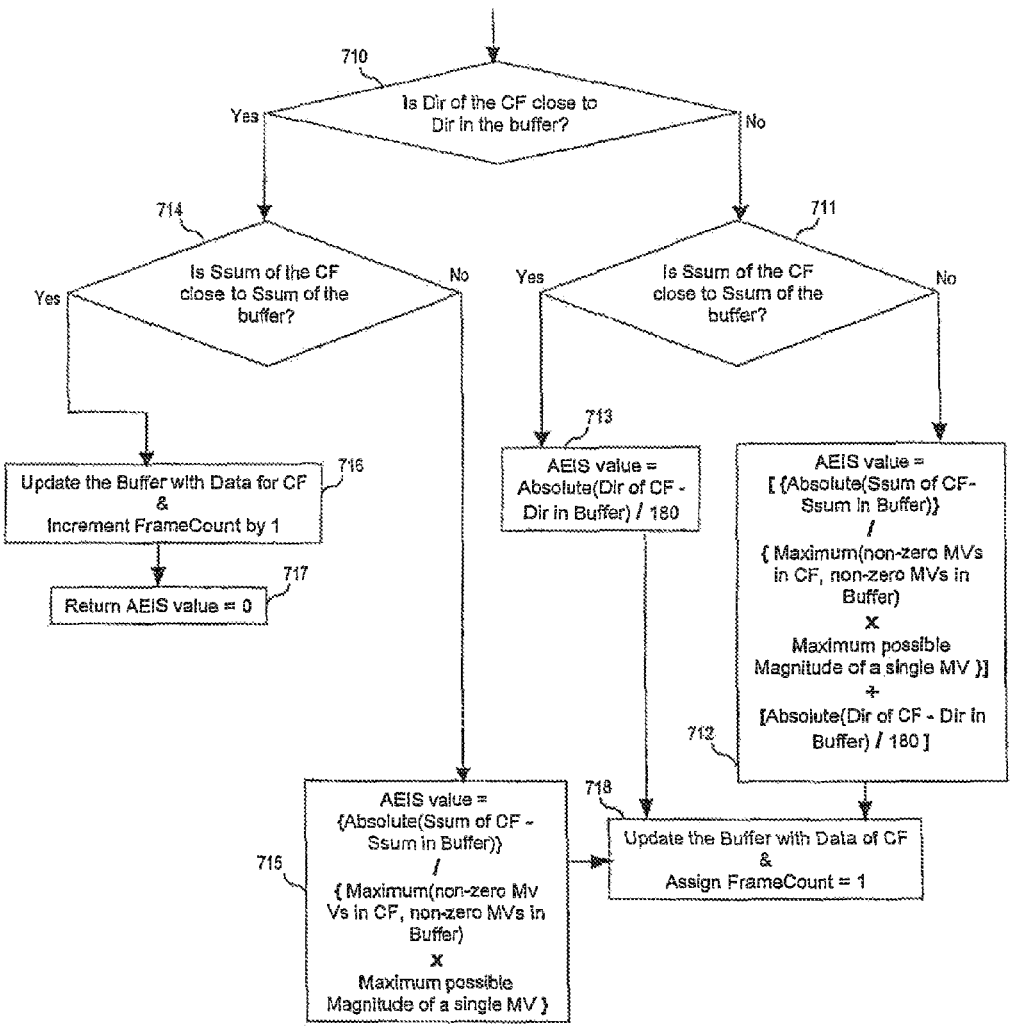

FIG. 7(a), and its continuation in FIG. 7(b), show a method according to the invention for extracting AEISs in video footage, and assigning to each frame an AEIS descriptor value which indicates how strong the AEIS is.

In the first step [701], we define few buffers which we'll use for identifying AEISs in the footage. We use a buffer which stores the following data of the previous frame: 1) The magnitude of a scalar sum of the Motion Vectors (Ssum) 2) The Direction of vector sum of all Motion Vectors (Dir) 3) The Number of non-zero Motion Vectors, that is the number of blocks, which have non-zero motion vectors.

We denote this buffer by PFB.

We also use one more buffer, named 'FrameCount', which stores the number of frames immediately preceding the current frame (CF), having some identical pattern. This buffer is initialised to zero.

In the step [702] of the method we get the next available frame and mark it as the Current Frame (CF).

By the definition of an AEIS, we only consider that the current frame may be an AEIS if a certain pattern has continued for a certain number of preceding frames greater than a threshold. Just because by chance some 2-3 frames show some identical pattern, this does not necessarily indicate that there is any AEIS. So, in step [703] we check the FrameCount, and see if it is greater than a threshold.

If the decision at step [703] is "No", then in step [704] we set an AEIS descriptor value for the CF to be equal to zero. Then we update the value of FrameCount by analyzing the CF. If we find in step [705] that there is hardly any motion in the CF, e.g. only 2 or 3 blocks show a non-zero Motion Vector value, then we can assume that the object in the CF is too small to give any AEIS. Specifically, in step [705] we measure the motion value of the CF, which is equal to the magnitude of the scalar sum of all Motion Vectors in the frame, and if it is less than a threshold then we update PFB by making it empty and assigning FrameCount equal to zero (step [706]).

If we find in step [705] that the scalar sum of all Motion Vectors in CF is greater than the threshold then in step [707] we check whether CF has the same pattern of Dir and SSum as in PFB. Specifically, we test whether Absolute (Ssum of the CF-Ssum in Buffer) is less than a certain threshold, and whether Absolute (Dir of CR-Dir in Buffer) is less than a certain threshold.

If either of these conditions is not met, then in step [708] we set FrameCount equal to one. This is because the CF showed a pattern different from its previous frames. We also update PFB with data of the CF.

Alternatively, if in step [707] both the conditions are met, then in step [709] we increment FrameCount by one. This is because the CF showed the same pattern as previous frames. We also update PFB using the data of the CF.

We now consider what occurs if the decision at step [703] is "Yes". If FrameCount is greater than the threshold, then there is a possibility that CF represents an AEIS. In step [710] we analyze the CF and check if the Dir is about the same as in PFB. Specifically, we test whether Absolute (Dir of the CF-Dir in Buffer) is less than a certain threshold. If so, in step [714] we check if the Ssum is about the same as in PFB. Specifically, we test whether Absolute (Ssum of the CF-Ssum in Buffer) is less than certain threshold. If yes, then in step [716] we increment FrameCount by 1 and update PFB using the CF data, and in step [717] we set the value of the AEIS descriptor of the CF to be equal to zero.

If the decision in step [714] is "No", then the CF does not have the same pattern of Ssum as PFB. In this case, we set the AEIS value to be equal to the value of {Absolute (Ssum of the CF-Ssum in Buffer)} divided by the product of Maximum (non-zero MVs in CF, non-zero MVs in Buffer) and the Maximum possible Magnitude of a single MV (step [715]).

If the decision in step [710] is "No", then the CF does not have the same pattern of Dir as PFB. In this case, in step [711] we test whether the Ssum of the CF is similar to that of the buffer. Specifically, we test whether Absolute (Ssum of the CF-Ssum in Buffer) is less than certain threshold, as in step [714].

If the result of step [711] is "yes", then in step [713] we set the AEIS value to be equal to the value of Absolute (Dir of the CF-Dir in Buffer)/180.

If the result of step [711] is "No", then in step [712] we set the AEIS value to be equal to [{Absolute (Ssum of CF-Ssum in Buffer) divided by the product of Maximum (non-zero Mvs in CF, non-zero Mvs in Buffer) and Maximum possible Magnitude of a single MV}]+[Absolute (Dir of CF-Dir in Buffer)/180].

Following all of steps [715], [713] and [712], we perform step 718 of updating the buffer with the data for the CF and setting FrameCount equal to one. Thus, a new pattern has been defined starting from CF the PFB data has been updated accordingly.

Figure 8:
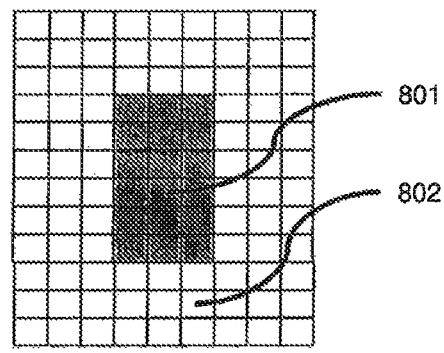
FIG. 8 shows how a frame is divided into smaller blocks and illustrates the meanings of the terms 'Central Blocks' and 'Surrounding Blocks'.

FIG. 8 shows one way in which a frame can be divided into a central region (801) and a surrounding region (802) for the purposes of finding TIS's. To simplify calculation the blocks in each region are typically of equal size although this does not have to be the case.

Figure 9:
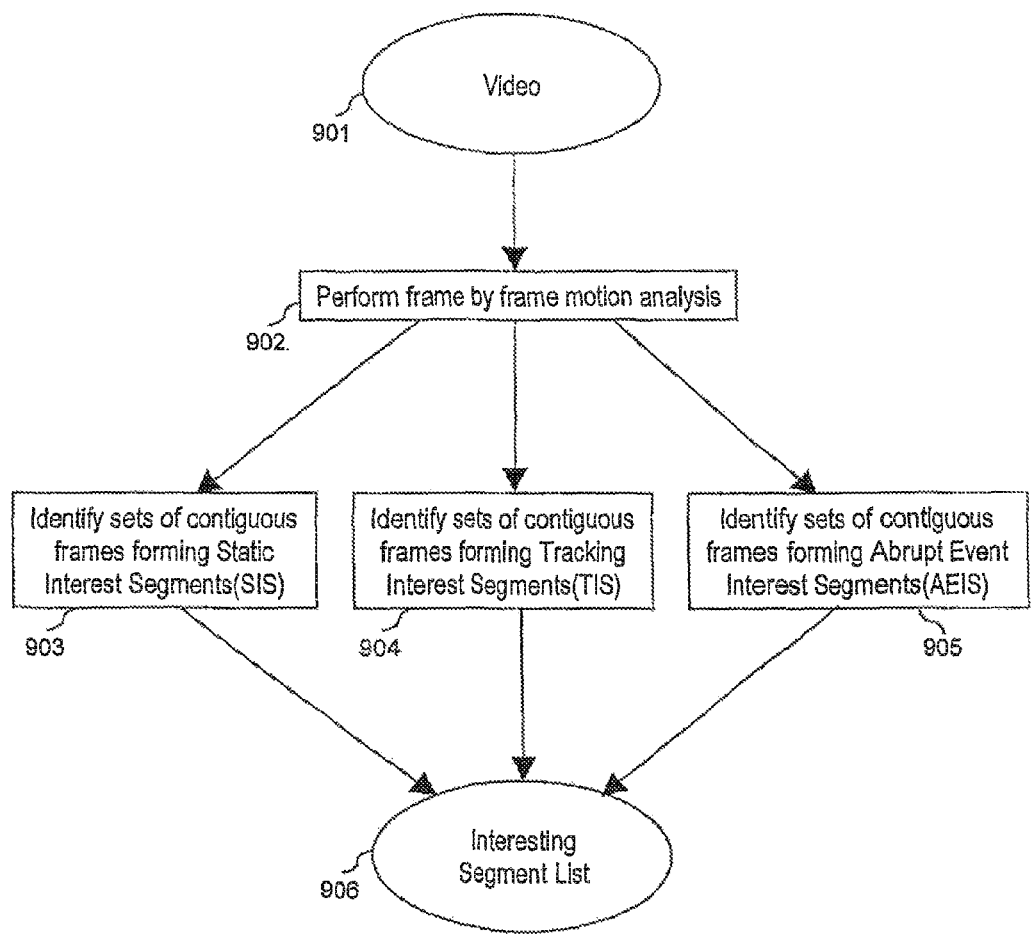
FIG. 9 shows schematically an overview of how interesting regions are identified in video footage in various methods according to the invention.

FIG. 9 is an overview of how the interesting regions are identified in video footage in various methods according to the invention. We perform motion analysis (step [902]) on each frame of the given video ([901]). Subsequently we identify Static Interest Segments (SIS) (Setp [903]), Tracking Interest Segments (TIS) (step [904]), and Abrupt Event Interest Segments (AIES) (step [905]) by the methods described above, and put all these interesting segments into an interesting segment list (step [906]).

Although the invention has been discussed above in relation to particular embodiments, many variations are possible within the scope of the invention, as will be clear to an expert. For example, the methods of identifying the SISs, TISs and AEISs may be supplemented by consideration of other descriptors than the ones considered here. Such descriptors, having values, which can be found from the footage, may increase the accuracy of the identification.

Furthermore, the identification methods may make use of any existing information about the video footage, such as low-level video signal characteristics, characteristics of the encoded video stream, or meta data encoded in or supplied to, the video content. This information may be combined with the values of the descriptors to give more accurate identifications.

What is claimed is:

1. An automated method comprising:
   a user initiating the method in a processor, the processor arranged to receive video footage, the video footage having been previously recorded by a hand held video camera,
   calculating an amount of camera motion in each frame;
   calculating a direction of camera motion in the each frame,
   identifying a plurality of sequential frames within the video footage in which the hand held camera was held substantially steady during recording where:
     (i) the amount of camera motion is below a first threshold; and
     (ii) an average amount of change in the direction of camera motion is above a second threshold;
   marking the identified plurality of sequential frames in which the amount of camera motion is below the first threshold and in which the average amount of change in the direction of camera motion is above the second threshold as a static interest segment; and
   providing an edited version of the video footage including the marked plurality of sequential frames.

2. The method according to claim 1, in which identifying the plurality of sequential frames employs information about the video footage which is received in combination with the video footage.

3. A method of encoding video footage including identifying the plurality of sequential frames in the video footage by a method according to claim 1, and encoding the identified plurality of sequential frames with a higher precision than other portions of the video footage.

4. The method according to claim 1, further comprising:
   searching for interesting previously recorded video data within a video database,
   identifying portions of the video database, and
   returning said identified portions against a search query.

5. The method according to claim 1, further comprising a method of associating data with video footage, the method including identifying portions of the video footage and associating the data with the identified portions.

6. The method according to claim 1, further comprising:
   mixing the edited version with an audio piece, to derive an audio-video footage, and
   synchronizing the identified plurality of sequential frames with the audio piece to obtain the audio-video footage.

7. An automated method comprising:
   a user initiating the method in a processor, the processor arranged to receive video footage taken using a hand held camera, the video footage having been previously recorded by a hand held video camera,
   calculating the speed of camera motion (SCM),
   calculating the direction of camera motion (Dir),
   taking the difference of the Dir for each frame from previous frame (DeltaDir),
   identifying contiguous frame segments where DeltaDir is above a DeltaDir Threshold (DeltaDirTH) and where the number of such contiguous frames in the segment is greater than a frame count threshold (FrmTH),
   calculating the average SCM for the identified segments,
   marking any identified segments in which average SCM is below a threshold as a static interest segment, and
   providing an edited version of the video footage including the static interest segments.

* * * * *